United States Patent [19]

Johnson

[11] Patent Number: 5,065,647
[45] Date of Patent: Nov. 19, 1991

[54] BIT FOR DRILLING CAST IRON

[75] Inventor: Jonathon S. Johnson, Brighton, Mich.

[73] Assignee: Ford Motor Company, Dearborn, Mich.

[21] Appl. No.: 572,646

[22] Filed: Aug. 27, 1990

[51] Int. Cl.⁵ .................. B23B 51/02; B23P 15/32
[52] U.S. Cl. .................. 76/108.6; 408/144; 408/145; 408/230
[58] Field of Search .............. 408/144, 145, 227, 230; 76/108.6

[56] References Cited

U.S. PATENT DOCUMENTS

| 4,583,888 | 4/1986 | Mori et al. | 408/59 |
| 4,679,971 | 7/1987 | Maier. | |
| 4,728,231 | 3/1988 | Kunimori et al. | |
| 4,762,445 | 8/1988 | Bunting et al. | 408/144 |

FOREIGN PATENT DOCUMENTS

| 132652 | 2/1985 | European Pat. Off. | 408/145 |
| 116795 | 9/1979 | Japan. | |
| 90623 | 5/1985 | Japan | 408/227 |
| 1064701 | 3/1989 | Japan | 408/145 |
| 2152703 | 6/1990 | Japan | 408/144 |
| 2085769 | 5/1982 | United Kingdom | 408/144 |

Primary Examiner—Daniel W. Howell
Attorney, Agent, or Firm—Joseph W. Malleck; Roger L. May

[57] ABSTRACT

Method of making and tool bit construction; the bit has a diametrical blade implant of a two-phase material: a main phase of cemented carbine with diffusion bonded cubic boron nitride insert phases placed at high stress corners of such blade, limited strictly to the radial cutting zone of the bit without penetrating the centering zone.

7 Claims, 1 Drawing Sheet

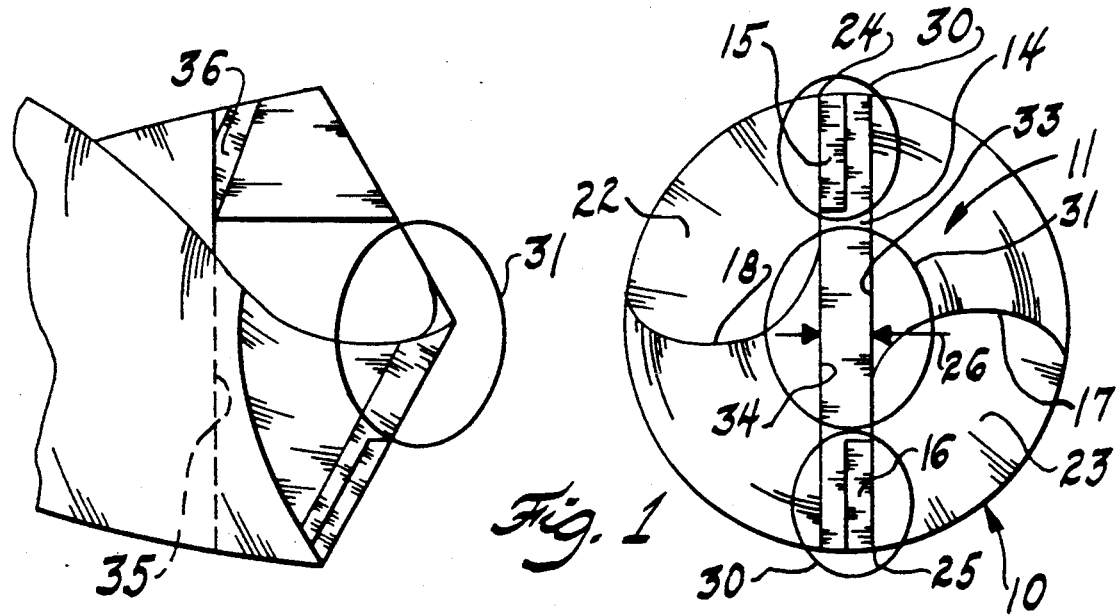
Fig. 1
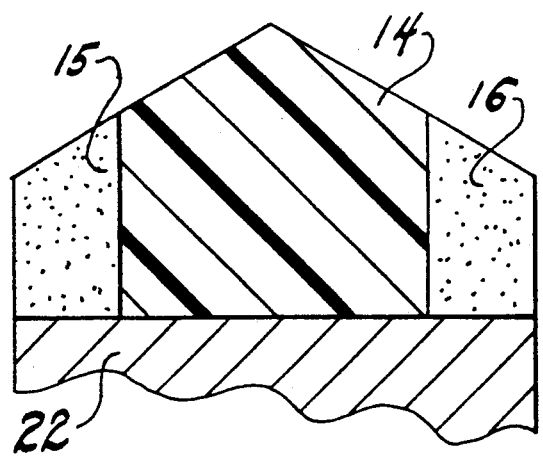
Fig. 3
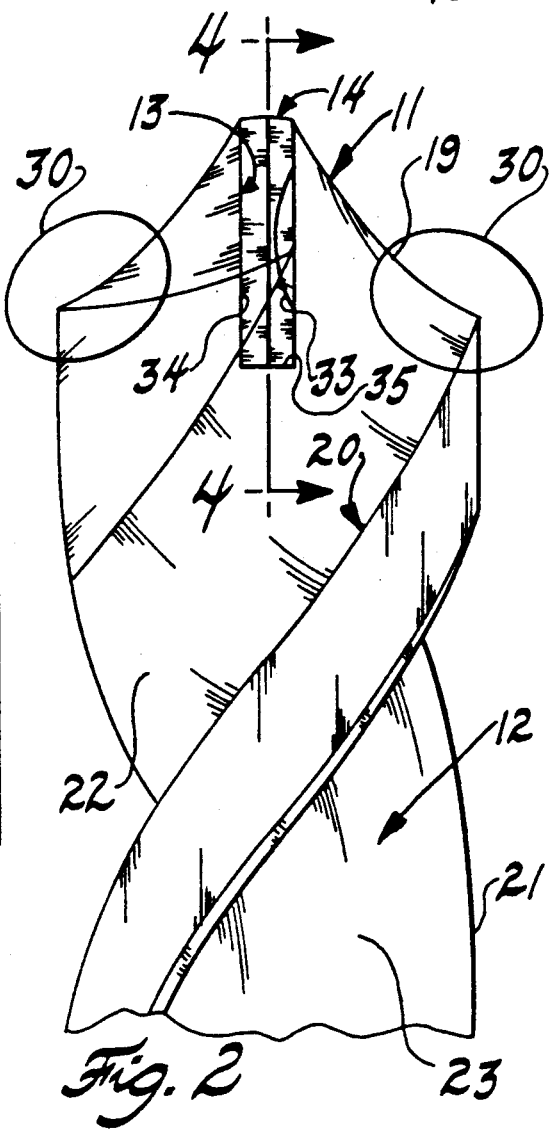
Fig. 4
Fig. 2

BIT FOR DRILLING CAST IRON

BACKGROUND OF THE INVENTION

1. Technical Field

This invention relates to the technology of making hard tipped fluted drill bits, and more particularly to the art of high speed drilling in rigorous material such as cast iron.

2. Discussion of the Prior Art

Tool steel is generally used in the construction of drill bits for drilling cast iron workpieces at drill speeds up to 400 rpm. However, with increases in drill speed (i.e., 10,000–40,000 rpm at penetration rates of up to 40–300 inches/minute) the cutting tips of such tool steel wear excessively and limit the bit life to an uneconomical circumstance.

Tips of such bits have been fitted with inserts of a more wear resistant material such as cemented carbide In Japanese patent publication 116 795 (1979), a plurality of elements were used to make up a carbide tip, leading to balance and chattering problems.

In search of even harder edge materials with even greater wear resistance at higher drilling speeds, the prior art has turned to boron nitride which additionally has excellent thermal stability. As revealed in U.S. Pat. No. 4,679,971, sometimes the boron nitride can be planted as short blades on a backing strip inserted into the tip, the blades extending partly radially from the cutting zone into the centering zone of the drill bit. As shown in FIG. 3 of such patent, these blades mutually abut at the center axis of such tool. Juncture of the boron nitride and the steel bit resides in the centering zone which leads to considerable breakage and chipping. This same patent attempts to overcome such breakage by fitting a cap of boron nitride around the entire tip of the tool. This is undesirable from a fabrication and exorbitant cost standpoint. Moreover, such cap still lacks support for resisting transverse forces.

In U.S. Pat. No. 4,728,231, such support problem was recognized and suggested that the entire diametrically extending implant be made of cubic boron nitride. Unfortunately, cubic boron nitride is brittle and cannot be easily secured to other metals, such as by brazing. Cubic boron nitride is unbrazable because it does not melt at brazing temperatures.

What is needed is an improved method of making and improved drill bit construction that permits cubic boron nitride to be used as an edge material for such drill bit without suffering from chip and breakage problems as well as securement problems so prevalent with the prior art. Overcoming these problems will result in highly improved drilling quality at such high speeds accompanied by highly increased wear life.

SUMMARY OF THE INVENTION

The problems associated with the prior art have been overcome by constructing a diametrical blade implant of a two-phase material: a main phase of cemented carbide and insert phases of cubic boron nitride placed at high stress corners of such blade, the inserts being diffusion bonded to the carbide and being limited strictly to the radial cutting zone of the bit without penetrating the centering zone.

In particular, the method aspect of this invention comprises adapting a fluted drill bit for more effective drilling of cast iron workpieces, comprising the steps of: (a) providing, across the pointed end of the fluted drill bit, a diametrically extending slot; (b) forming a blade effective to snugly fit within the contours of said slot, said blade being comprised of cemented carbide powder within which is molecularly bonded a pair of inserts constituted of cubic boron nitride, said inserts being located at opposite outside corners of said blade and extending radially inwardly no greater than the cutting zone of said pointed end of the fluted drill bit; and (c) after seating said blade within said slot, fixedly securing the carbide surfaces of said blade to the walls of said slot. The interface between the steel of said bit and the cubic boron nitride of said blade is desirably limited to less than 2% of the total secured (brazed) area of the blade.

Preferably, the drill bit is comprised of high speed tool steel, such as ASTM M-2, and the blade is a dual phase material having a primary matrix phase of cemented carbide, such as ASTM C-2, and an insert phase of cubic boron nitride powder, the matrix and insert phases being commonly hot pressed at a temperature of 2500° C. and a pressure of about one million psi to achieve diffusion bonding.

Advantageously, the pointed end of the tool bit has a conical end face with frontal cutting edges and lateral cutting edges along the tool's shank separated by flutes forming helical cutting edges, the frontal cutting edges and lateral cutting edges intersecting at opposite sides of said tool bit to form corners at which the cubic boron nitride inserts are located.

Preferably, the means by which the cemented carbide is secured to the tool steel is by way of brazing with a composition consisting primarily of silver.

DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 1 is a view of a tool bit construction embodying the principles of this invention and is taken along the axis of the bit showing its tip end;

FIG. 2 is a side view of the construction in FIG. 1 taken substantially along line 2-2 thereof;

FIG. 3 is another side view of the construction in FIG. 1 taken substantially along line 3-3 thereof;

FIG. 4 is an enlarged elevational view of the blade implant.

DETAILED DESCRIPTION AND BEST MODE

Construction

The tool or drill bit structure of this invention, effective to drill cast iron workpieces at speeds of 10,000–40,000 rpm and feed rates of 40–350 inches/minute while possessing a drill life of at least 1000 holes, comprises a metallic body 10 having a conical tip or end 11 and a main shank 12; a slot 13 is formed in the tip of such tool, and a blade 14 is snugly seated within such slot, the blade consisting of a composite material with inserts 15 and 16 placed in critical locations.

The tip of the drill bit has frontal cutting edges 17 and 18 defined in the conical end face 19. Lateral helical cutting edges 20 and 21 are defined along the shank 12 separated by flutes 22 and 23. The intersection of the frontal and lateral cutting edges define opposite corners 24, 25 of the tool tip end.

The slot 13 is machined or cut into the end of such tool bit so that it extends between and includes such opposite outside corners 24, 25 or intersections. The slot shape may have a rectangular cross-section and, most importantly, extends diametrically between opposite corners of blade 14 which coincide with the edge intersections defining outside corners 24, 25. The slot width 26 typically should be in the range of 25-35% of the diameter of the tool bit. If the width is greater than this range, then the drill bit will be excessively weakened by the loss of material; if the width is smaller, the insert will be too thin for practical manufacturability and will likely break during the drilling operation.

The material of which the drill body is comprised may be high speed tool steel or cemented carbide. It desirably has a hardness of 61-63 $HR_c$ and a composition such as 0.68% C, 0.3% Mn, 5.0% Mo, 4.0% Cr, 1.7% V, 6.7% W, and the remainder essentially Fe. The diameter of the shank may range from 0.25 to 2.0 inches, but is desirably about ⅜ inch. The blade is formed of a composite material having a principal matrix of cemented carbide particles within which is diffusion bonded the pair of insert phases 15, 16 of cubic boron nitride located at corners 24, 25 of such blade. A pair of insert phases is required because of the necessity to symmetrically balance and eliminate any chatter or reduction in strength of the tool cutting tip. The blade is hot pressed by the following process. Substantially pure cubic boron nitride and cementable carbide powders are carefully placed in a pressing crucible in juxtaposition to locate the phases, the powders are heated to around 2500° C. and pressed to 800,000–1,000,000 psi; such pressure and temperature must be maintained for about 20 minutes. The powder particles will be diffusion bonded.

The inserts 15, 16 extend radially inwardly no greater than the cutting zone 30 of the pointed end of the fluted drill bit and are absent from the centering zone 31 of such tool bit. Centering zone 31 is used herein to mean the inner third of the drill bit where cutting velocity approaches zero; cutting zone 30 is used herein to mean the outer third of the drill bit where cutting velocity is near its maximum.

The blade is secured to the body by brazing, such as by use of a braze material having silver. Brazing is carried out by assembling the brazing material and the blade in the slot and heating the assembly to the melting point of the braze, such as by use of induction coils. As shown in FIGS. 1-3, the surfaces of the blade that are to be brazed to the walls 36 of the slot consist substantially of all the exposed sides of the blade except for 33, 34, 35; only a small segment 36 of the cubic boron nitride interfaces with the tool steel body at 36 and this area is limited to less than 10% (preferably 2% or less) of the total interfacing surface area with the steel body. More importantly, this interface is outside the chip formation zone (cutting zone) and therefore not prone to cracking or chipping.

The method aspect of this invention comprises essentially three steps: (a) providing, across the pointed end 11 of the fluted drill bit, a diametrically extending slot 13; (b) forming a blade 14 effective to snugly fit within the contours of the slot, the blade being comprised of cemented carbide powder particles within which is diffusion bonded a pair of inserts 15, 16 constituted of cubic boron nitride, the inserts being located at opposite corners of the blade and extending radially inwardly no greater than the cutting zone 30 of the pointed end of the fluted drill bit; and (c) after seating the blade within the slot, fixedly securing the carbide surfaces 33, 34, 35 of the blade 14 to the walls of the slot.

The pointed end of the fluted drill bit has a rake angle in the range of 0°-10°; the end is preferably defined to have a back rake angle of about 7° and a side rake angle of about 0°, and the slot is preferably formed to a depth of about 80% of the drill diameter.

A series of samples were prepared and evaluated to corroborate the advantages of this invention. All the sample drill bits had the body formed of high speed tool and of an overall drill diameter of 5/16. The drill bits were all used to drill cast iron workpieces having a chemistry typically of Ford pearlite gray iron. The drills were operated at a speed of 10,000-40,000 rpm and a feed of 240 inches/minute. Each tool bit had an overall geometry of 5/16 diameter.

The use or nonuse of blades was tested as well as various insert configurations. The tool life, as measured by the number of one inch deep holes drilled, gave a clear indication of the potential of this invention. The test results are presented in Table I.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE I

| | Blade Chemistry | | Size (in terms of bit diameter) | | | | | | Test Result |
| | | | Blade | | Insert | | | | |
| Sample | matrix | insert | length | width | length | width | Configuration | Tool Life | Comments |
| --- | --- | --- | --- | --- | --- | --- | --- | --- | --- |
| 1 | none (solid tool steel drill) | none | — | — | — | — | | — | drills broke on first hole |
| 2 | none (solid carbide drill) | none | — | — | — | — | | one-three | excessive wear |
| 3 | cemented carbide | none | 2 opposed parts, each ⅜ diam. | ¼ D | — | — | | one-three | inserts chipped |
| 4 | cemented carbide | CBN | 2 opposed parts, each ⅜ diam. | ¼ D | ⅛ diam. | ¼ D | | none | inserts broke on first hole |
| 5 | cemented carbide | none | full diam. | ¼ D | — | — | | one-three | excessive wear |
| 6 | cemented carbide | CBN | full diam. | ¼ D | full diam. | ¼ D | | none | inserts chipped on first hole |
| 7 | cemented | CBN | full | ¼ D | ¼ D | ¼ D | | 1015 | excellent wear |

TABLE I-continued

| | Blade Chemistry | | Size (in terms of bit diameter) | | | | | | Test Result |
| | | | Blade | | Insert | | | | |
| Sample | matrix | insert | length | width | length | width | Configuration | Tool Life | Comments |
| | carbide (invention) | | diam. | | | | | | characteristic |

I claim:

1. A method of adapting a fluted drill bit for more effective drilling of cast iron workpieces, comprising:
   (a) providing, across the pointed end of said fluted drill bit, a diametrically extending slot;
   (b) forming a blade of a matrix phase of cemented carbide particles which are hot pressed at a temperature of about 2500° F. and at a pressure in the range of 800,000–1,000,000 psi, said blade being effective to snugly fit within the contours of said slot, said blade being comprised of cemented carbide powder within which is diffusion bonded a pair of insert phases constituted of cubic boron nitride, said insert phases being located at opposite outside corners of said blade and extending radially inwardly no greater than the cutting zone of said pointed end of the fluted drill bit; and
   (c) after seating said blade within said slot, fixedly securing the carbide surfaces of said blade exposed to the walls of said slot.

2. A method of adapting a fluted drill bit for more effective drilling of cast iron workpieces, comprising:
   (a) providing, across the pointed end of said fluted drill bit, a diametrically extending slot;
   (b) forming a blade effective to snugly fit within the contours of said slot, said blade being comprised of cemented carbide powder within which is diffusion bonded a pair of insert phases constituted of cubic boron nitride, said insert phases being located at opposite outside corners of said blade and extending radially inwardly no greater than the cutting zone of said pointed end of the fluted drill bit; and
   (c) after seating said blade within said slot, fixedly securing the carbide surfaces of said blade exposed to the walls of said slot, the interface between said drill bit and cubic boron nitride being 2% or less of the total fixed area of said carbide surfaces to the slot walls.

3. The method as in claim 2, in which each of said inserts are shaped to fit the contour of said slot as well as the contours of said cutting edges and shank.

4. The method as in claim 2, in which said cemented carbide powders and cubic boron nitride powder are diffusion bonded independent of said slot.

5. The method as in claim 2, in which the blade thickness is in the range of 25–35% of the diameter of said tool bit.

6. The method as in claim 2, in which said pointed end is defined by frontal cutting edges on said conical end face and lateral helical edges along the shank of said tool bit separated by a helical flute and the intersection of said frontal and lateral cutting edges defining two opposed cutting corners.

7. The method as in claim 6, in which the slot extends to include said two intersecting corners.

* * * * *